Feb. 27, 1934.　　R. E. RUNDELL　　1,948,597
UNIVERSAL JOINT
Filed Oct. 20, 1932

INVENTOR
Rupert E. Rundell
BY Sydney Prescott
ATTORNEY

Patented Feb. 27, 1934

1,948,597

UNITED STATES PATENT OFFICE 1,948,597

UNIVERSAL JOINT

Rupert E. Rundell, Rockville Center, N. Y., assignor to International Cigar Machinery Company, a corporation of New Jersey Application October 20, 1932. Serial No. 638,821

1 Claim. (Cl. 131—39)

This invention relates to an improvement in knurlers for cigar machines, its main object being to provide a cigar knurler which can be readily placed in any desired position while being operated.

This object is achieved by driving the knurler through a universal joint so that it may be turned about either or both of two axes which are at right angles to each other, without interrupting its drive. With this and other objects not specifically mentioned in view, the invention consists in certain constructions and combinations hereinafter fully described and then specifically set forth in the claim hereunto appended.

In the accompanying drawing which forms a part of this specification and in which like characters of reference indicate the same or like parts:

Figure 1:
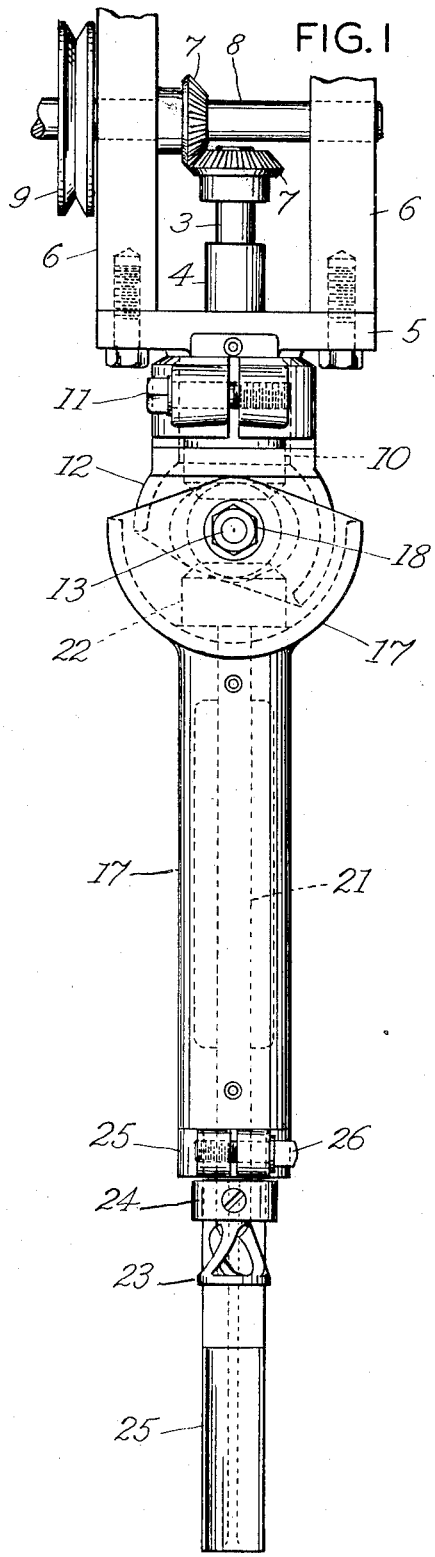
Fig. 1 is a top view of the improved adjustable knurler.
Figure 2:
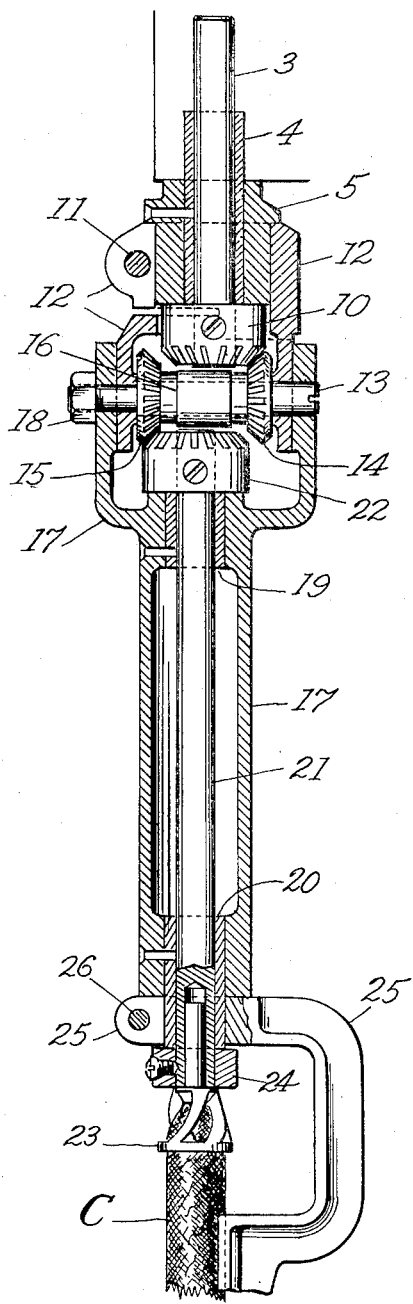
Fig. 2 is a sectional side elevation of the same.

In carrying the invention into effect there is provided a knurler head, universally adjustable means for supporting the knurler head, and mechanism for rotating the knurler head in any adjusted position. In the best forms of construction contemplated, said means includes a bracket, a socket rotatably mounted in said bracket, a pin transversely disposed in said socket, and a holder rotatably mounted on said pin and said mechanism including relatively eccentric shafts journaled in the bracket and holder and geared to each other, the knuler head being mounted on the shaft in the holder. These various means and parts may be widely varied in construction within the scope of the claim for the particular device selected to illustrate the invention is but one of many possible concrete embodiments of the same. The invention, therefore, is not to be restricted to the specific construction shown and described.

Referring to the drawing, a horizontal shaft 3, supported by a bushing 4 held in a bracket 5 attached to the frame 6 of the cigar machine, is driven by bevel gear 7 from a shaft 8 to which motion is imparted from the cigar machine drive by a pulley 9 mounted thereon. At its inner end the shaft 3 carries a bevel gear 10 which drives the knurler head through a train of gears, as will be presently described.

To the hub-portion of bracket 5 is clamped, by a bolt 11, a socket 12 the forked ends of which carry a pin 13 on which are loosely mounted two bevel gears 14 and 15 separated by a spacer 16 having its ends fixed to the gears. On the ends of pin 13 are turnably mounted the forked ends of a tubular holder 17 which can be secured in any angular position by a nut 18 on pin 13.

In bushings 19 and 20, the holder 17 supports a knurler shaft 21 which carries a bevel gear 22 at one end and the knurler head 23 at the other. The shaft 21 is placed eccentric to shaft 3 so that the bevel gear 10 will mesh with bevel gear 14 and bevel gear 22 with bevel gear 15 without interference. A collar 24 prevents axial movement of shaft 21 and thus keeps the gears 15 and 22 in proper mesh.

The bushing 20 protrudes beyond the end of holder 17 and carries a rest piece 25 for guiding the cigar C to be knurled, the said rest piece being clamped to bushing 20 by means of a bolt 26.

The holder 17 being turnable on pin 13, and the socket 12 being turnable on the hub of bracket 5 which is concentric with the drive shaft 3, without disengagement of the bevel gears 10 and 14 and of the bevel-gears 15 and 22, the knurler-head 23 may be readily moved into any position most convenient to the operator during the operation of the machine.

What is claimed is:

In a cigar knurler, the combination with a knurler head, of universally adjustable means for supporting the knurler head, and mechanism for rotating the knurler head in any adjusted position, said means including a stationary bracket, a socket rotatably mounted on said bracket, a device for releasably clamping said socket on said bracket, a threaded pin transversely disposed in said socket, a holder rotatably mounted on said pin, and a nut on the threaded portion of said pin for releasably clamping said holder to said socket, and said mechanism including a driven shaft journaled in said bracket, a knurler shaft journaled in said holder with its axis parallel to the axis of the driven shaft, said shafts being eccentric to each other, bevel gears on said shafts, and a pair of connected bevel gears loosely mounted on said pin and meshing with the gears on said driven and knurler shafts respectively, said knurler head being mounted on said knurler shaft, whereby the knurler shaft is driven in the same direction as the driven shaft.

RUPERT E. RUNDELL.